No. 613,077. Patented Oct. 25, 1898.
J. A. RICHARD.
NUT LOCK.
(Application filed May 31, 1898.)
(No Model.)
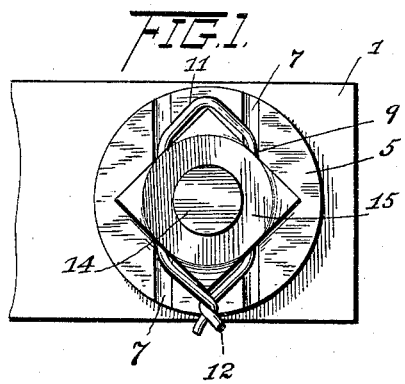
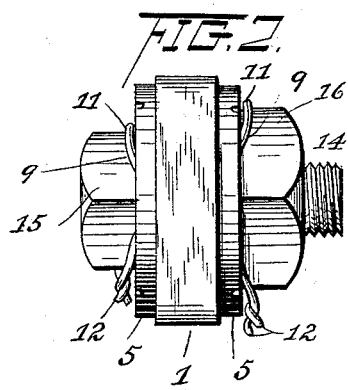
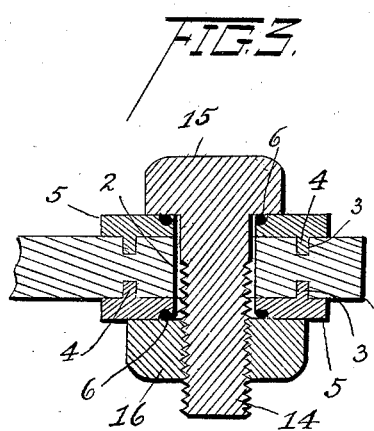
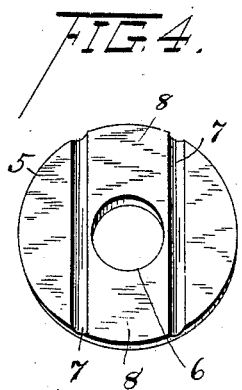
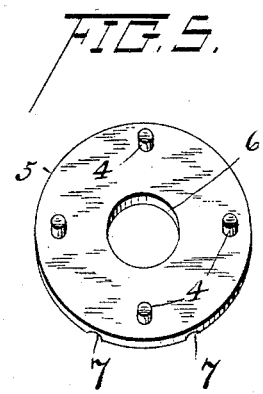
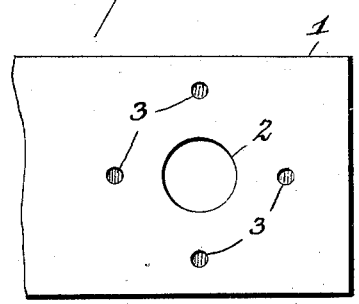
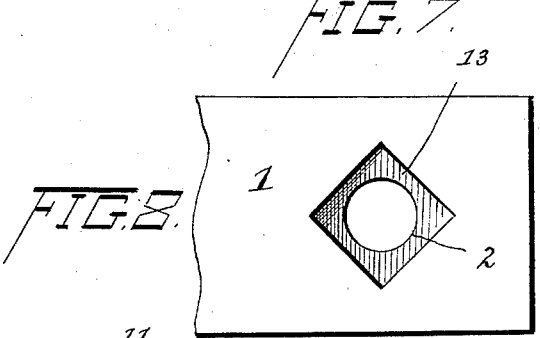
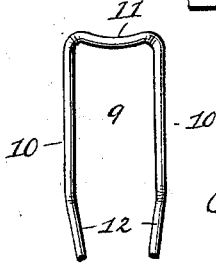
Witnesses
Saml R Turner
Chas. S. Hyer
Inventor
Joseph A. Richard.
By R. H. W. Lacey,
Attorneys.
THE NORRIS PETERS CO., PHOTO-LITHO., WASHINGTON, D. C.

UNITED STATES PATENT OFFICE.

JOSEPH A. RICHARD, OF ST. LOUIS, MICHIGAN.

NUT-LOCK.

SPECIFICATION forming part of Letters Patent No. 613,077, dated October 25, 1898.

Application filed May 31, 1898. Serial No. 682,170. (No model.)

*To all whom it may concern:*

Be it known that I, JOSEPH A. RICHARD, a citizen of the United States, residing at St. Louis, in the county of Gratiot and State of Michigan, have invented certain new and useful Improvements in Nut-Locks; and I do hereby declare the following to be a full, clear, and exact description of the invention, such as will enable others skilled in the art to which it appertains to make and use the same.

This invention relates to nut-locks; and it consists, essentially, of a washer having rear pins to fit openings in an adjacent part and parallel grooves extending entirely across the outer face, combined with a locking-staple interposed between the nut and washer and partially engaging the said grooves, the continuous end of the staple extending across the web between the grooves and the free ends drawn together and twisted against an adjacent corner or angle of the nut, thereby forcing the said continuous end in like manner against the opposite corner or angle.

The invention further consists of the details of construction and arrangement of the several parts, which will be hereinafter more fully described and claimed.

The object of the invention is to prevent loosening and running off of a nut from a bolt after it has been secured by the improved devices through vibration or other causes, and thereby provide a safe and positive connection of the nut with the bolt.

In the accompanying drawings, Figure 1 is a front elevation of a nut and a part or fish-plate to which the same is applied and showing the improved nut-lock. Fig. 2 is a side elevation of the device shown by Fig. 1. Fig. 3 is a horizontal section through the nut, bolt, and locking devices. Fig. 4 is a detail perspective view of the improved washer forming a part of the nut-lock and looking toward the outer face thereof. Fig. 5 is a similar view of the washer, looking toward the rear face of the same. Fig. 6 is an elevation of a portion of the fish-plate or other support, showing the openings therein around the bolt-opening for the application of the washer. Fig. 7 is a detail elevation looking toward the rear side of a fish-plate or other support and showing a bolt-head recess or countersink around the bolt-opening. Fig. 8 shows detail views of the improved locking-staple.

Referring to the drawings, wherein similar numerals are employed to indicate corresponding parts in the several views, the numeral 1 designates a fish-plate or other part or support having therein a bolt-opening 2. It will be understood that the number of bolt-openings 2 may be varied in accordance with the dimensions of the fish-plate or support 1 and also relatively to the purposes of the bolt and nut and the number required to obtain efficient securing means. Around the bolt-opening 2 recesses 3 are regularly arranged to receive and form seats for pins 4 on the rear side of a washer 5, the latter having a central bolt-opening 6, which is adapted to coincide with the bolt-opening 2, and when the pins 4 are in engagement with the recesses 3 the washer 5 will be prevented from moving or having any rotation whatsoever. When the washers 5 are applied to the opposite sides of the fish-plate or support 1, as shown by Figs. 1, 2, and 3, the recesses 3 will be similarly formed in opposite sides of said fish-plate or support, and by these means the head of the bolt, as well as the nut on the threaded shank thereof, can be locked against rotation or movement.

The outer face of the washer 5 is formed with a pair of grooves 7, which are parallel and disposed on opposite sides of the central bolt-opening 6. The said grooves open out at opposite points of the edge of the washer, and above and below the central bolt-opening between the said grooves is a flat web 8 in the same plane as the entire face of the washer.

With the washer 5 a locking-staple 9 is used, and as primarily formed consists of opposite legs 10, having a continuous loop 11 at one end, and the opposite free ends 12 are slightly bent inwardly toward each other and outwardly or upwardly from the plane of the said legs. The continuous end 11 is also struck outwardly at a slight angle of inclination. Owing to the contour of the said staple a portion of the legs 10 engage the grooves 7 and the continuous end extends across one of the flat webs 8, while the free ends project partially over the opposite flat web 8, and when in locking position, as clearly shown by Figs. 1 and 2, the continuous end is drawn tightly against one of the angles or corners of the nut, and the free ends are twisted and bear against the opposite corner or angle, both locking portions of the staple standing outwardly from the adjacent portions of the washer, which are the opposite flat webs 8.

In fish-plates, supports, or other devices to which the bolt and nut are applied and where the bolt-head countersink or recess 13 is formed as shown by Fig. 7 one of the washers and locking-staples may be dispensed with, and the bolt-head is held against movement by the engagement with the countersink or recess.

In assembling the several parts the bolt 14, having a head 15, is passed through the fish-plate and the applied washer or washers, and the nut 16 is previously run back on the threaded part of the bolt 14, sufficient room being left for the insertion of the staple 9, or where two sets of staples and washers are used the staple to engage the bolt-head 15 is placed in position, preferably, previous to the insertion of the staple to lock the nut. After the staple or staples are in proper position the nut is tightened against the washer and a greater part of the legs 10 of the staple 9 are forced into the groove 7, sufficient play being given to the nut to permit it to be forced firmly against said washer. After the nut is thus adjusted the free ends of the staple are drawn together by a suitable implement and twisted or interlocked, and the drawing tension thus exerted on the entire staple forces the continuous end of the staple against an adjacent corner or angle of the nut and closely binds the same, and at the same time the said twisted ends are also brought to bear closely against an opposite corner or angle, and by these means the nut is prevented from turning or having any movement. The resistance to the movement of the nut is instituted by the position of the greater portion of the opposite legs of the staple within the grooves 7, and the said grooves being straight and the nut firmly holding them in their desired position, preventing the staple from slipping when the free ends thereof are twisted to simultaneously lock opposite sides of the nut. The same operation is carried on in connection with the bolt-head 15 when a staple and washer are used therewith, as shown by Figs. 1, 2, and 3, and, as stated, when a bolt-head recess or countersink 13 is employed it will not be necessary to use the extra staple and washer. The staple is further prevented from having a slipping action by the immovable mounting of the washer 5, and it is intended that the grooves 7 be positioned as shown in Fig. 1, for the reason that it is much easier to connect the free ends of the staple. It will be understood, however, that the washer might be so arranged as to position said grooves at another angle without affecting the efficiency of the staple as a lock when arranged as set forth.

It will be observed that by having the continuous end of the staple and also the free ends thereof normally standing outward and away from the opposite adjacent portions of the washer a better purchase is obtained when the said staple is drawn to a locking position, and, furthermore, the tension exerted on the free ends in twisting the same causes the continuous end of the staple and also the legs adjacent said free ends to approximately conform to the angles or corners of the nut.

By the use of the nut-lock described it is unnecessary to cut or aperture or groove on the nut or bolt, and the expense usually required in arranging ordinary forms of nut-locks wherein the bolt and nut are particularly constructed is avoided, and the enlarged portions of the nut-lock being independent of the bolt and nut itself it can be readily applied to different bolts and nuts varying in proportions and dimensions.

The improved nut-lock is adapted for use generally and wherever it is desired to lock a nut against accidental disengagement, and when it is desired to remove the nut the twisted free ends of the staple-legs can be released and the staple withdrawn or moved sufficiently to permit the nut to be run off of the bolt.

It is obviously apparent that minor changes within the scope of the invention can be made as may be found necessary in various applications.

Having thus described the invention, what is claimed as new is—

1. In a nut-lock, the combination of a supporting device having a bolt-opening therethrough and recesses around the latter, a washer having a central bolt-opening and pins on the rear side to engage said recesses and straight parallel grooves in the outer face on the opposite sides of the bolt-opening therein, a bolt and nut, and a locking-staple having its continuous end and the free ends of the opposite legs bent outwardly, the said staple being inserted between the nut and washer and having opposite portions of the legs resting in the grooves of said washer and the free ends thereof twisted to draw the same and the continuous end against opposite corners or angles of the nut.

2. In a nut-lock, the combination of a washer, a nut and bolt, and a locking-staple interposed between the said washer and nut and having its continuous end and the free ends of the legs normally bent outwardly, the said free ends of the legs being twisted and drawn together with the continuous end of said staple against opposite corners or angles of the nut.

In testimony whereof I affix my signature in presence of two witnesses.

JOSEPH A. RICHARD.

Witnesses:
GEO. S. ALDRICH,
GEO. W. LONG.